US008908325B1

(12) United States Patent
Heo et al.

(10) Patent No.: US 8,908,325 B1
(45) Date of Patent: Dec. 9, 2014

(54) THREADED DISK CLAMPING ELEMENT WITH STEP ON DISK CONTACT SURFACE

(71) Applicant: Western Digital Technologies, Inc., Irvine, CA (US)

(72) Inventors: Baekho Heo, San Jose, CA (US); Joshua P. Weiher, Bellevue, WA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/791,865

(22) Filed: Mar. 8, 2013

(51) Int. Cl.
*G11B 17/02* (2006.01)
*G11B 17/028* (2006.01)

(52) U.S. Cl.
CPC .................................. *G11B 17/0284* (2013.01)
USPC ....................................................... 360/99.12

(58) Field of Classification Search
CPC .. G11B 17/02; G11B 17/028; G11B 17/0284; G11B 33/14; G11B 33/1473; G11B 19/20; G11B 19/2009
USPC ...................... 360/99.12, 99.06, 99.08, 99.16
See application file for complete search history.

(56) References Cited

U.S. PATENT DOCUMENTS

| 4,918,545 A | 4/1990 | Scheffel |
| 5,235,482 A | 8/1993 | Schmitz |
| 5,452,157 A | 9/1995 | Chow et al. |
| 5,517,376 A | 5/1996 | Green |
| 5,731,928 A | 3/1998 | Jabbari et al. |
| 5,801,901 A | 9/1998 | Bryan et al. |
| 5,867,346 A * | 2/1999 | Teshima ..................... 360/99.08 |
| 5,940,244 A | 8/1999 | Canlas et al. |
| 6,046,889 A | 4/2000 | Berding et al. |
| 6,052,890 A | 4/2000 | Malagrino, Jr. et al. |
| 6,055,123 A | 4/2000 | Kazmierczak et al. |
| 6,061,206 A | 5/2000 | Foisy et al. |
| 6,101,876 A | 8/2000 | Brooks et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,208,486 B1 | 3/2001 | Gustafson et al. |
| 6,215,616 B1 | 4/2001 | Phan et al. |
| 6,282,054 B1 | 8/2001 | Luo |
| 6,288,866 B1 | 9/2001 | Butler et al. |
| 6,292,333 B1 | 9/2001 | Blumentritt et al. |
| 6,304,417 B1 | 10/2001 | Bracken et al. |
| 6,344,950 B1 | 2/2002 | Watson et al. |
| 6,349,464 B1 | 2/2002 | Codilian et al. |
| 6,366,427 B1 | 4/2002 | West |
| 6,388,873 B1 | 5/2002 | Brooks et al. |

(Continued)

OTHER PUBLICATIONS

Jifang Tian, et al., U.S. Appl. No. 13/722,903, filed Dec. 20, 2012, 28 pages.

*Primary Examiner* — Allen T Cao

(57) ABSTRACT

A disk drive assembly having a disk hub comprising a substantially cylindrical portion having a side wall, a disk clamping element having a body portion having an inner wall configured to engage the side wall of the disk hub, and an undercut portion extending radially outward from a radially inner diameter of the body portion for a portion of a radius of the disk clamping element to form a step; and a disk media disposed between the disk hub and the disk clamping element, wherein the disk clamping element is oriented such that the undercut portion is positioned proximate to the disk media.

15 Claims, 8 Drawing Sheets

(56) References Cited

U.S. PATENT DOCUMENTS

| | | |
|---|---|---|
| 6,417,979 B1 | 7/2002 | Patton, III et al. |
| 6,417,988 B1 | 7/2002 | Renken et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,567,238 B1 | 5/2003 | Renken et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Gustafson et al. |
| 6,624,968 B1 | 9/2003 | Chessman et al. |
| 6,624,980 B1 | 9/2003 | Watson et al. |
| 6,624,983 B1 | 9/2003 | Berding |
| 6,628,473 B1 | 9/2003 | Codilian et al. |
| 6,654,200 B1 | 11/2003 | Alexander et al. |
| 6,657,811 B1 | 12/2003 | Codilian |
| 6,661,597 B1 | 12/2003 | Hanan et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,724,568 B1 | 4/2004 | Suwito et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,760,188 B2 | 7/2004 | Choo et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,788,495 B2 | 9/2004 | Aiello |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,009,809 B2 | 3/2006 | Hanssen |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,042,676 B2 | 5/2006 | Yoo |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,181,824 B1* | 2/2007 | Suwito et al. .............. 29/603.03 |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |

(56) References Cited

U.S. PATENT DOCUMENTS

| | | |
|---|---|---|
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,307,813 B1 * | 12/2007 | Suwito ............... 360/98.08 |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,379,267 B2 | 5/2008 | Engesser et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,589,935 B2 | 9/2009 | Kim |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,787,214 B2 * | 8/2010 | Miyamori et al. ......... 360/99.12 |
| 7,823,270 B2 | 11/2010 | Choo et al. |
| 7,826,177 B1 | 11/2010 | Zhang et al. |
| 7,852,601 B1 | 12/2010 | Little |
| 7,864,488 B1 | 1/2011 | Pan |
| 7,872,830 B2 | 1/2011 | Ruden et al. |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |
| 2002/0034041 A1 * | 3/2002 | Luo et al. ................. 360/99.12 |
| 2002/0071206 A1 | 6/2002 | Choo et al. |
| 2002/0109939 A1 | 8/2002 | Schwandt et al. |
| 2004/0012882 A1 * | 1/2004 | Kim et al. ................. 360/99.12 |
| 2005/0174684 A1 | 8/2005 | Hanssen |

(56) References Cited

U.S. PATENT DOCUMENTS

| | | | |
|---|---|---|---|
| 2005/0264928 A1* | 12/2005 | Lee et al. | 360/98.08 |
| 2006/0139800 A1 | 6/2006 | Takahashi | |
| 2007/0035876 A1 | 2/2007 | Engesser et al. | |
| 2007/0058292 A1 | 3/2007 | Choi et al. | |
| 2007/0159717 A1 | 7/2007 | Miyajima et al. | |
| 2007/0253102 A1* | 11/2007 | Abdul Hameed | 360/99.08 |
| 2008/0019039 A1 | 1/2008 | Ng et al. | |
| 2010/0210366 A1* | 8/2010 | Droll et al. | 464/68.41 |
| 2011/0093874 A1 | 4/2011 | Suzuki | |
| 2011/0212281 A1 | 9/2011 | Jacoby et al. | |
| 2012/0050913 A1 | 3/2012 | Jang et al. | |
| 2013/0038964 A1 | 2/2013 | Garbarino et al. | |
| 2013/0091698 A1 | 4/2013 | Banshak, Jr. et al. | |
| 2013/0155546 A1 | 6/2013 | Heo et al. | |
| 2013/0290988 A1 | 10/2013 | Watson et al. | |

\* cited by examiner

THREADED DISK CLAMPING ELEMENT WITH STEP ON DISK CONTACT SURFACE

FIELD

The present disclosure relates generally to information storage devices and in particular to a disk clamping element of a disk drive.

BACKGROUND

Disk drives typically include a disk clamping element that provides a disk clamping force for holding one or more disks to a hub. Thus, disk clamping is becoming more and more important not only for regular hard disk drive (HDD) performance but also under extreme conditions such as operational shock and non-operational shock. A reliable clamping force may maintain the integrity of the whole disk pack, preventing the disk from separating or sliding under shock event. A reliable clamping force also helps limit the disk deflection, avoiding disk contact with other components including arms, cover, base and suspensions under low G shock.

With increasingly thinner HDD design, disk clamping design may become challenging due to limitations of smaller form factors. Some common concerns with clamping element design include maintaining a consistent clamping force with minimal variation in an axial direction. To address these concerns, threaded disk clamps are being developed. However, threaded disk clamps may produce greater disk conning (z-deflection of the disk medium) under regular clamping load compared to spring-loaded disk clamps. Additionally, threaded disk clamps may be more rigid and produce less clamping element deflection, which can increase the risk of disk medium breakage due to large stress concentration during drive shock situations.

BRIEF DESCRIPTION OF THE DRAWINGS

A general architecture that implements the various features of the disclosure will now be described with reference to the drawings. The drawings and the associated descriptions are provided to illustrate example embodiments of the disclosure and not to limit the scope of the disclosure. Throughout the drawings, reference numbers are reused to indicate correspondence between referenced elements.

FIG. 6 is a sectional view of the related art clamping element attached to a disk hub with a disk media disposed there between.

FIG. 7 is a sectional view of the first example embodiment of the clamping element attached to a disk hub with a disk media disposed there between.

DETAILED DESCRIPTION

Figure 1:
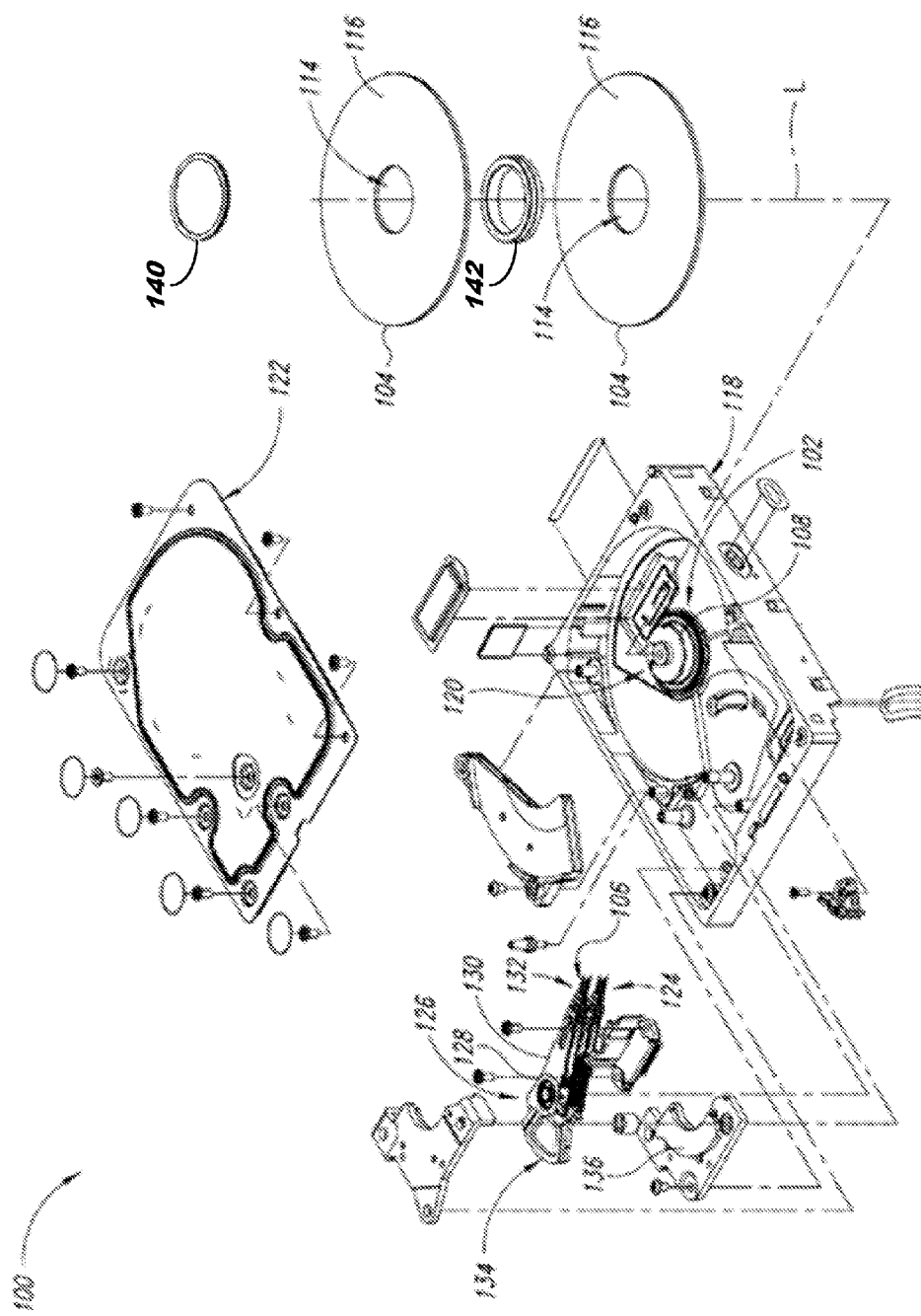
FIG. 1 is an exploded, perspective view generally illustrating a disk drive including an example clamping element and hub according to an example embodiment.

FIG. 1 illustrates an exploded, perspective view generally illustrating a disk drive including an example clamping element and hub according to an example embodiment. Further, FIG. 2 illustrates a sectional view of the disk drive including an example clamping element and hub according to the example embodiment.

Figure 2:
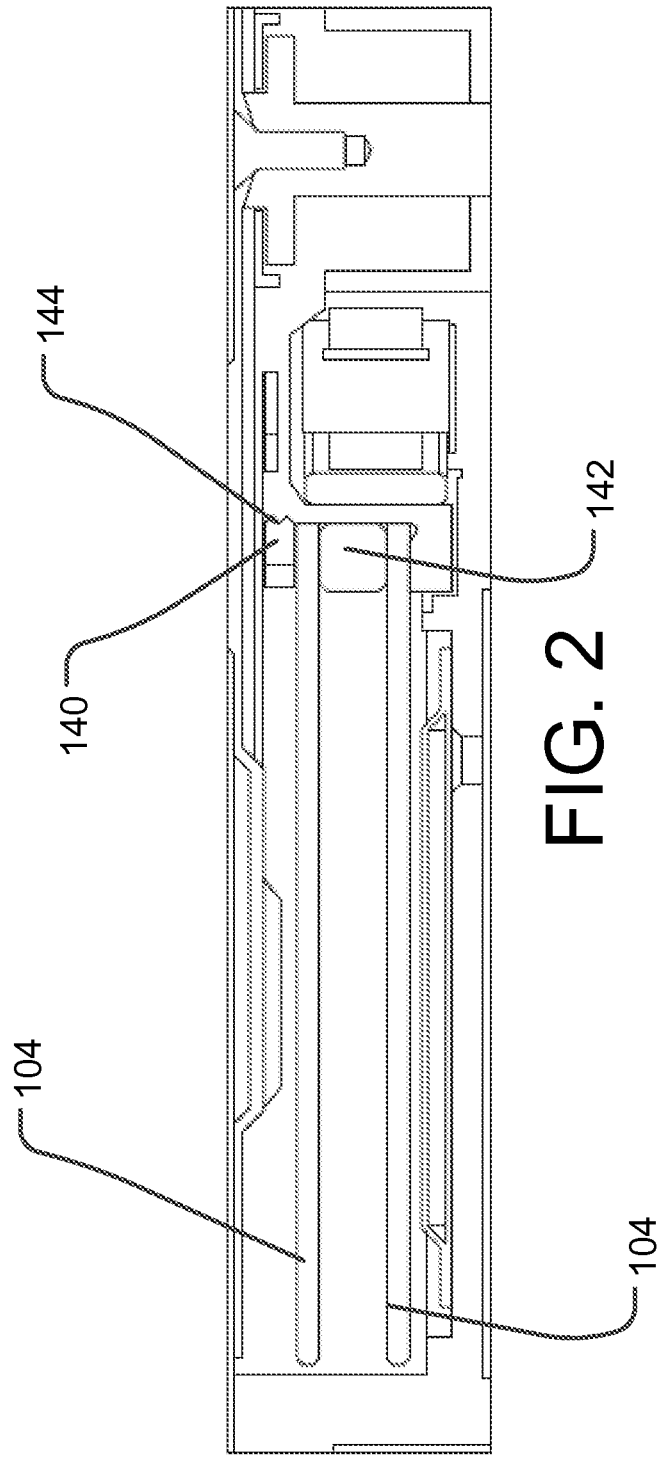
FIG. 2 is a sectional view illustrating a disk drive including an example clamping element and hub according to the example embodiment.

Referring to FIGS. 1 and 2, a disk drive 100 is illustrated, according to one example embodiment. The disk drive 100 comprises a hub 102, a disk media or disk 104 physically contacting and supported by at least one mounting surface of the hub 102, and a head 106 operable to write to and read from the disk 104. In one example embodiment, the hub 102 comprises a substantially cylindrical portion 108 which define a longitudinal axis L and a mounting surface substantially normal to the longitudinal axis L, the mounting surface extending radially outward.

As illustrated herein, the disk drive 100 comprises a magnetic disk drive, and the structures and methods described herein will be described in terms of such a disk drive. However, these structures and methods may also be applied to and/or implemented in other disk drives, including, for example, but not limited to, optical and magneto-optical disk drives.

The disks 104 may comprise any of a variety of magnetic or optical disk media having a substantially concentric opening 114 defined there through. Of course, in other embodiments, the disk drive 100 may include more or fewer disks. For example, the disk drive 100 may include one disk or it may include two or more disks. If 2 or more disks 104 are used, a spacer 142 (shown in FIG. 2). The disks 104 each include a disk surface 116, as well as an opposing disk surface not visible in FIG. 1. In one example embodiment, the disk surfaces 116 comprise a plurality of generally concentric tracks for storing data.

As illustrated, the hub 102 may be coupled to and support the disks 104. The hub 102 may also be rotatably attached to a motor base 118 of the disk drive 100, and may form one component of a motor 120 (e.g., a spindle motor). The motor 120 and the hub 102 may be configured to rotate the disks 104 about the longitudinal axis L.

Further, a disk clamping element 140 may be coupled to the hub 102 to provide a downward clamping force to the disks 104. The disk clamping element 140 may be positioned above the disks 104 and attached to an upper surface of the hub 102. Further, as shown in FIG. 2, the disk clamping element may include a threaded region 144 which interacts with the hub 102. The interaction of the disk clamping element 140 and the hub 102 to provide the downward clamping force is discussed in more detail below. As discussed below, example embodiments of the clamping element 140.

The disk drive 100 may further include a cover 122, which, together with the motor base 118, may house the disks 104 and the motor 120. The disk drive 100 may also include a head stack assembly ("HSA") 124 rotatably attached to the motor base 118. The HSA 124 may include an actuator 126 including an actuator body 128 and one or more actuator arms 130 extending from the actuator body 128. The actuator body 128 may further be configured to rotate about an actuator pivot axis.

One or two head gimbal assemblies ("HGA") 132 may be attached to a distal end of each actuator arm 130. Each HGA 132 includes a head 106 operable to write to and read from a corresponding disk 104. The HSA 124 may further include a coil 134 through which a changing electrical current is passed during operation. The coil 134 interacts with one or more magnets 136 that are attached to the motor base 118 to form a voice coil motor ("VCM") for controllably rotating the HSA 124.

The head 106 may comprise any of a variety of heads for writing to and reading from a disk 104. In magnetic recording applications, the head 106 may include an air bearing slider and a magnetic transducer that includes a writer and a read element. The magnetic transducer's writer may be of a longitudinal or perpendicular design, and the read element of the magnetic transducer may be inductive or magneto resistive. In optical and magneto-optical recording applications, the head may include a mirror and an objective lens for focusing laser light on to an adjacent disk surface.

The disk drive 100 may further include a printed circuit board ("PCB") (not shown). The PCB may include, inter alia, a disk drive controller for controlling read and write operations and a servo control system for generating servo control signals to position the actuator arms 130 relative to the disks 104.

Figure 3:
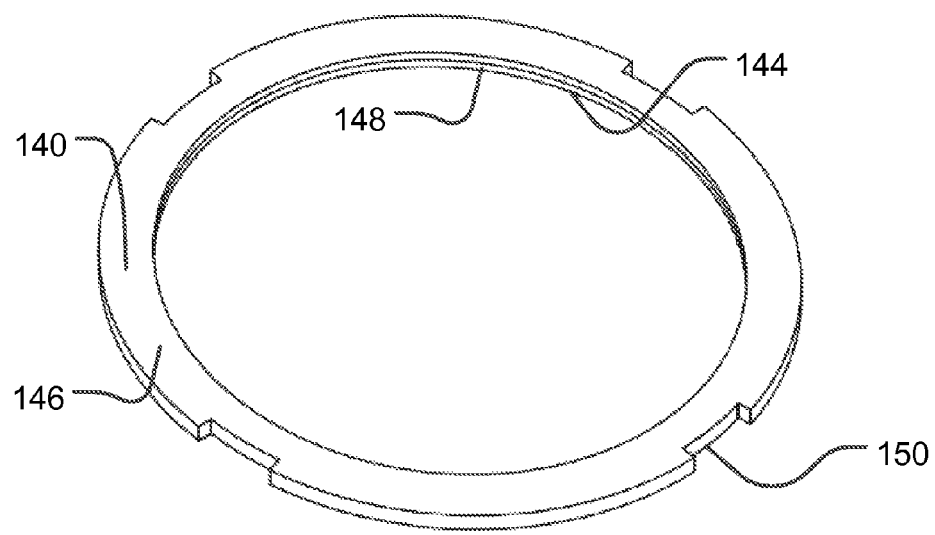
FIG. 3 is a perspective, top view of the clamping element according to the first example embodiment of FIGS. 1 and 2.

FIG. 3 is a perspective, top view of the clamping element according to the first example embodiment of FIGS. 1 and 2. The disk clamping element 140 includes a body portion 146 having a substantially cylindrical shape. Further, the body portion 146 may have a hollow radially inner region, such that the body portion 146 forms an annular shape. The radially inner vertical wall 148 of the annular shape of the body portion 146 may be configured to engage a vertical side wall of a cylindrical portion 108 of the hub 102. Additionally, in some example embodiments the vertical wall 148 may include a plurality of threads to form the threaded portion 144, as shown in FIG. 2. However example embodiments of the hub 102 and the clamping element 140 need not have a threaded portion formed thereon. Additionally, in some embodiments, a notch 150 may be formed on a radially outer region of the body portion 146.

Figure 4:
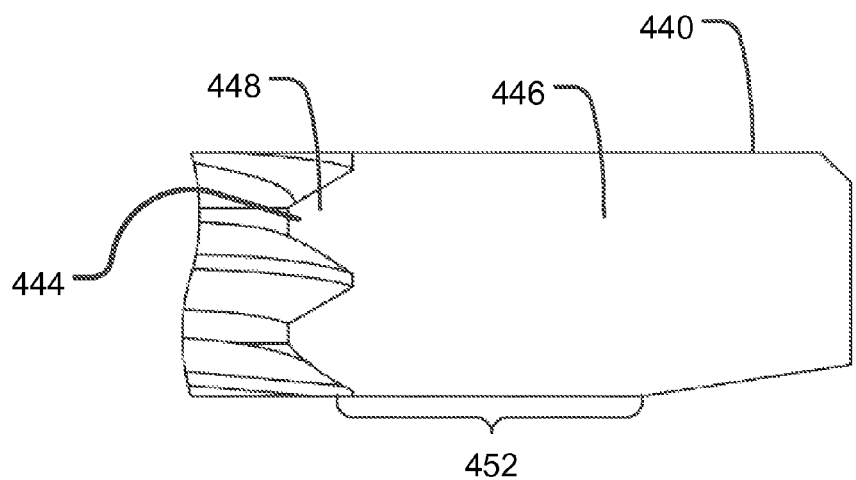
FIG. 4 is an enlarged sectional view of a clamping element according to a related art example.

FIG. 4 illustrates an enlarged sectional view of a clamping element 440 according to a related art example. The disk clamping element 440 includes a body portion 346 having a substantially cylindrical shape. Further, the body portion 446 may have a hollow radially inner region, such that the body portion 446 forms an annular shape. The radially inner vertical wall 448 of the annular shape of the body portion 446 may be configured to engage a vertical side wall of a cylindrical portion 108 of the hub 102. Additionally, the vertical wall 448 may include a plurality of threads to form a threaded portion 444, as shown in FIG. 4.

Further, the clamping element 440 of the related art example includes a substantially flat bottom forming a disk contacting surface 446 extending from the inner vertical wall 448 along substantially the entire radial length. However, as discussed in more detail below, having a substantially flat bottom along the radial length can cause conning or upward deflection of the disk media at radially out regions thereof.

Figure 5:
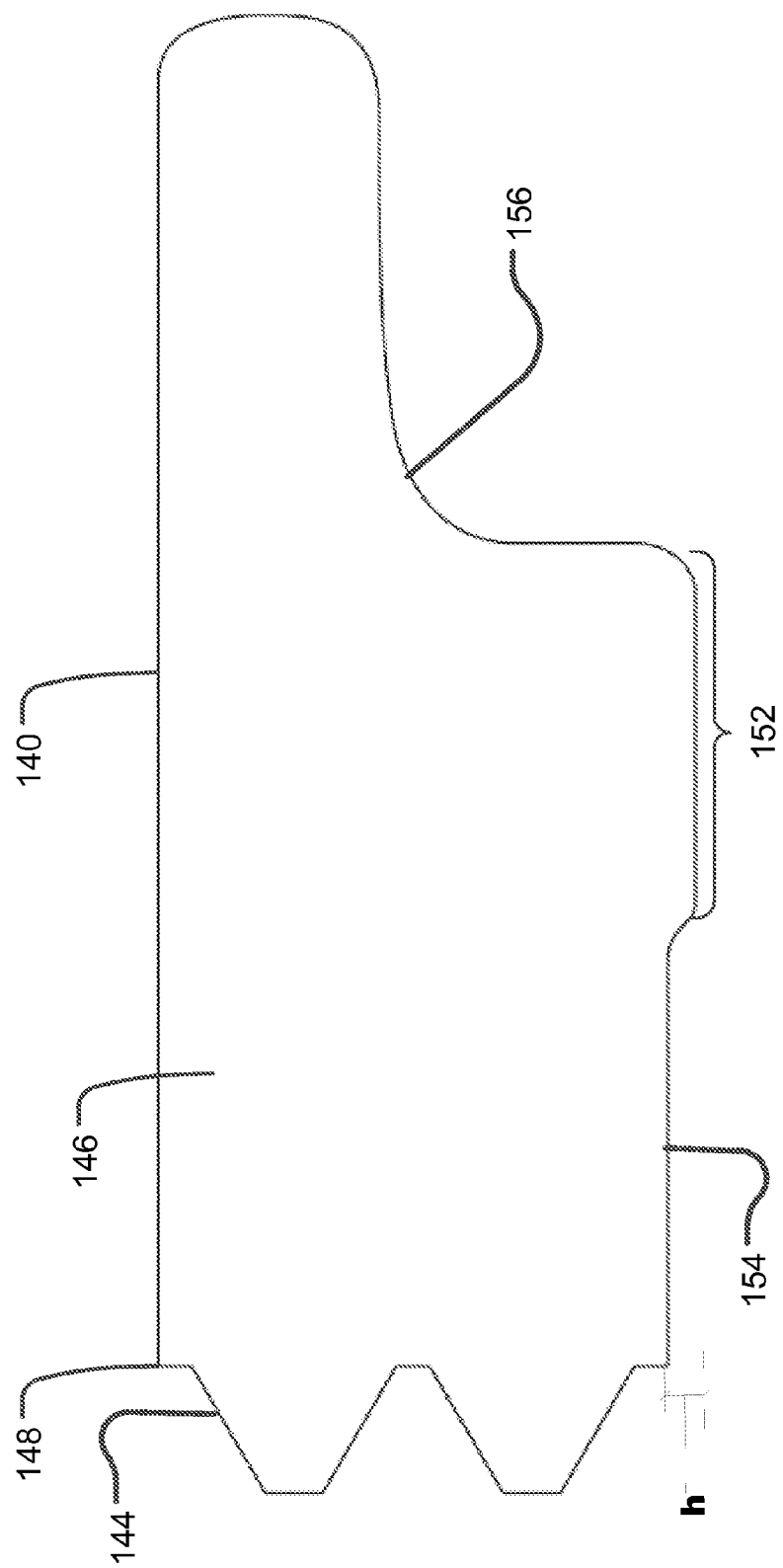
FIG. 5 is an enlarged sectional view of the first example embodiment of the disk clamp.

FIG. 5 is an enlarged sectional view of the first example embodiment of the disk clamp. As discussed above with respect to FIG. 3, the disk clamping element 140 includes a substantially cylindrical body portion 146 having a hollow radially inner region forming an annular shape. Further, the radially inner vertical wall 148 of the annular shape of the body portion 146 may be configured to form a threaded portion 144. Additionally, the clamping element 140 of the present embodiment also includes an undercut portion 154 formed at a radially inner region of the bottom surface of the clamping element 140. By providing the undercut portion 154 at the radially inner region of the bottom surface of the clamping element 140, the disk media contacting surface 152 is moved radially outward. As discussed below, by moving the disk media contacting surface 152 radially outwards, conning and deflection of the disk media 104 under the clamping force of the clamping element may be reduced.

The undercut portion 154 has a height h. In some embodiments, the height h of the undercut portion 154 may be 5 μm or more. In other embodiments, the height h of the undercut portion 154 may be directly proportional to the deflection of the radially inner most portion of the disk clamping element 140 in a z-direction when the drive is assembled.

Additionally, in the embodiment shown in FIG. 5, a cut-out portion 156 may be provided at the radially outer region of the disk clamping element 140. In some embodiments, the cut-out portion 156 may provide clearance for the head 106 to access an inner diameter of disk media 104. However, some embodiments of the present application are not limited to this configuration and need not have a cut-out portion on a radially outer region of the disk clamp.

Figure 6:
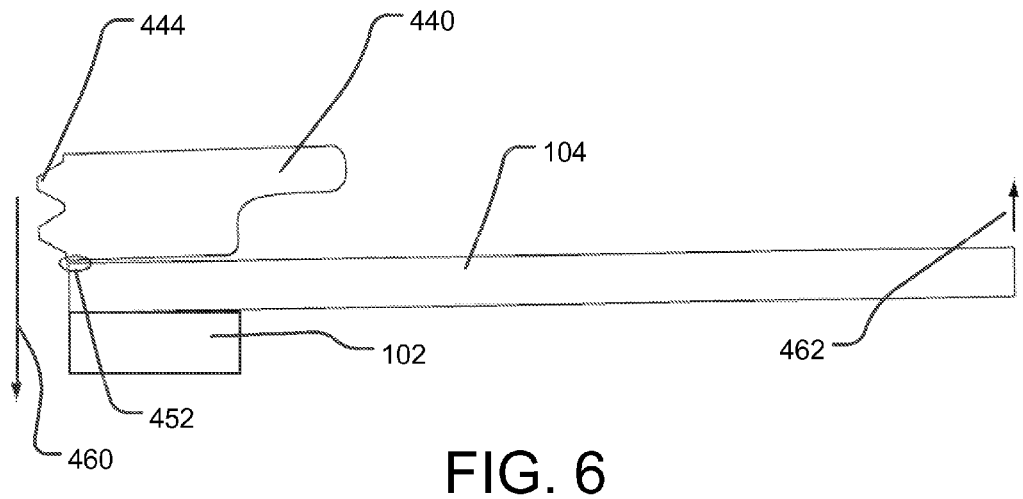
Figure 7:
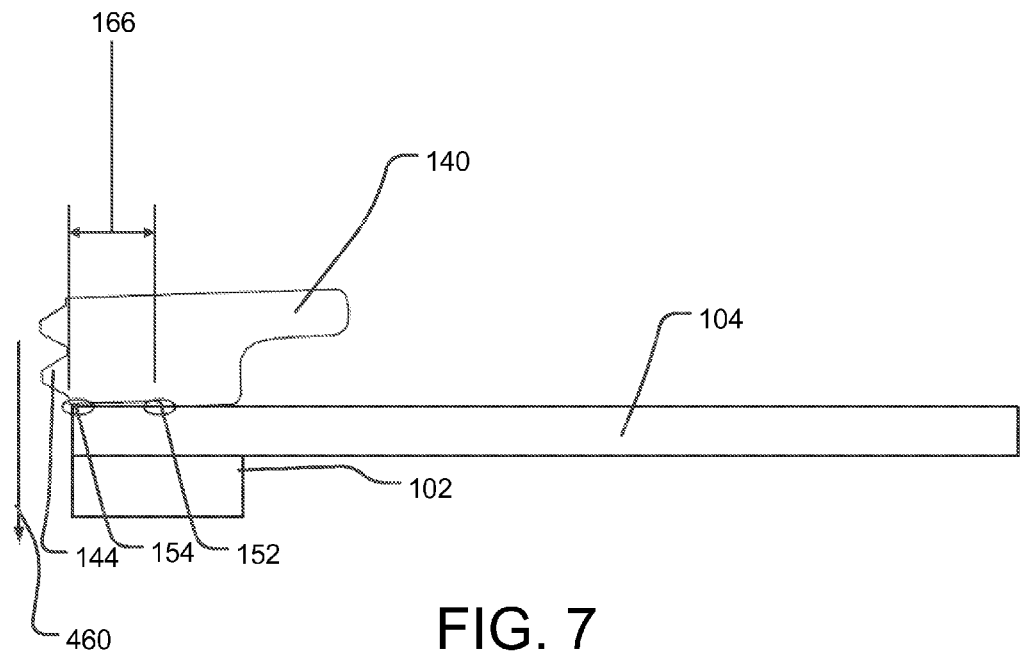

FIG. 6 illustrates a sectional view of the related art clamping element attached to a disk hub with a disk media disposed there between. FIG. 7 illustrates a sectional view of the first example embodiment of the clamping element attached to a disk hub with a disk media disposed there between. Comparing FIGS. 6 and 7 shows the effect of moving the disk contacting surface radially outward from the threaded portions 444, 144 of the disk clamps 440, 140 shown in FIGS. 6 and 7 respectively.

In FIG. 6, the disk contacting surface 452 of the disk clamping element 440 is disposed immediately adjacent the threaded portion 444. As the threaded engagement between the hub (not shown in FIG. 6; 102 in FIG. 1) and the disk clamping element 440 allows very little deflection of the clamping element relative to the hub, the downward clamping force 460 applied by the disk clamping element 440 causes the disk medium 104 to deflect (represented by 462) upward at the radially outer region due to the force 460 being applied at the radially inner region of the disk medium 104.

Conversely, in FIG. 7, the undercut portion 154 provided immediately adjacent the threaded portion 144 causes the disk contacting surface 152 of the disk clamping element 140 to be moved radially outward a distance 166. This distance 166 represents an increased clamping radius for the point of application of the clamping force 160 applied by the disk clamping element 140 to the disk media 104. This increased clamping radius 166 can reduce the amount of deflection at the radially outer region of the disk media 104.

Figure 8:
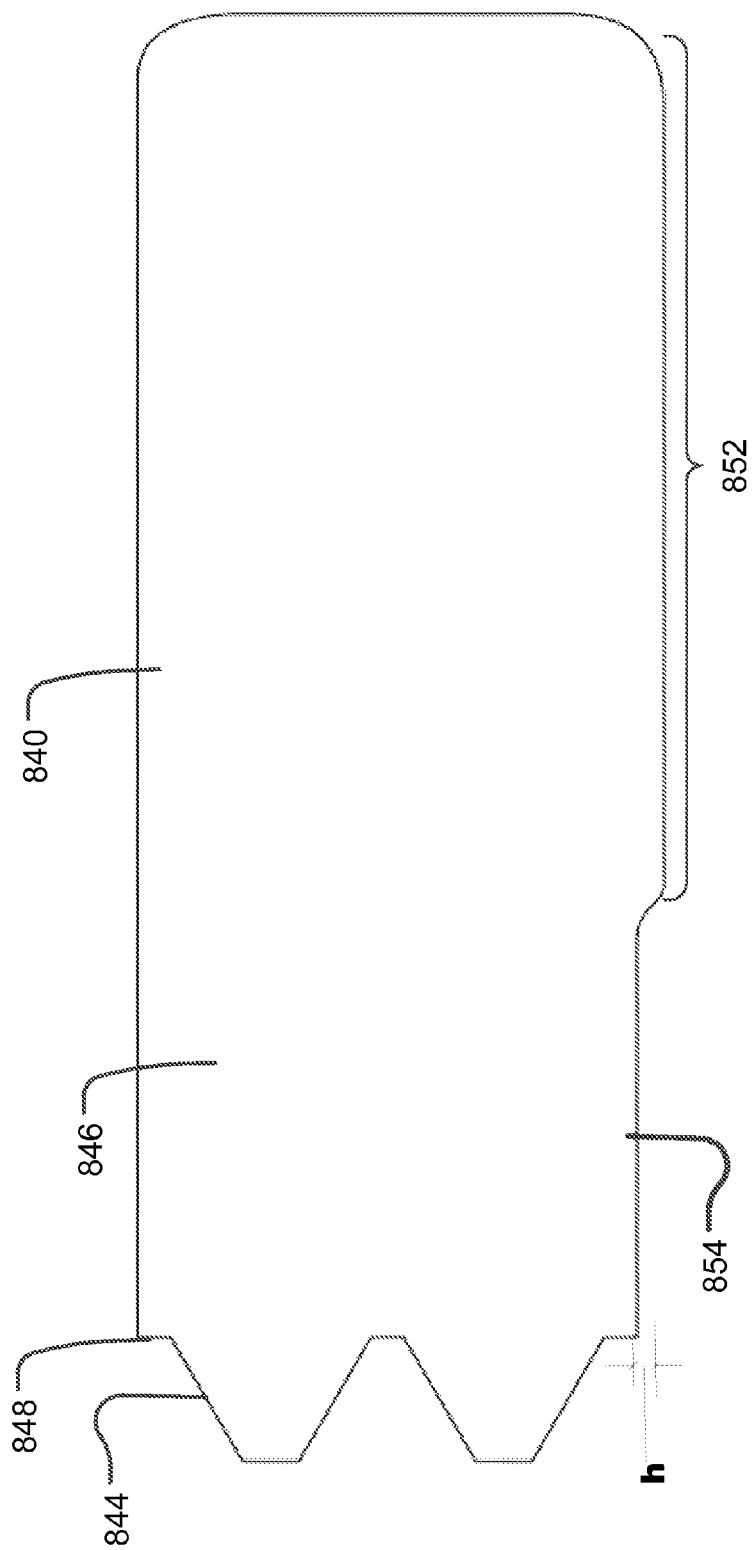
FIG. 8 is an enlarged sectional view of a second example embodiment of the disk clamp.

FIG. 8 is an enlarged sectional view of a second example embodiment of the disk clamping element 840. This second example embodiment of the disk assembly has some features similar to the first example embodiment such that redundant description may be omitted.

As with the first embodiment of the disk clamping element 140 discussed above, the disk clamping element 840 includes a substantially cylindrical body portion 846 having a hollow radially inner region forming an annular shape. Further, the radially inner vertical wall 848 of the annular shape of the body portion 846 may be configured to form a threaded portion 844. Additionally, the clamping element 840 of the present embodiment also includes an undercut portion 854 formed at a radially inner region of the bottom surface of the clamping element 840. By providing the undercut portion 854 at the radially inner region of the bottom surface of the clamping element 840, the disk media contacting surface 852 is moved radially outward. As discussed above, by moving the disk media contacting surface 852 radially outwards, conning and deflection of the disk media under the clamping force of the clamping element may be reduced.

The undercut portion 854 has a height h. In some embodiments, the height h of the undercut portion 854 may be 5 μm or more. In other embodiments, the height h of the undercut portion 854 may be directly proportional to the deflection of the radially inner most portion of the disk clamping element 840 in a z-direction when the drive is assembled.

However, the embodiment shown in FIG. 5 includes a cut-out portion 156. Conversely, the embodiment shown in FIG. 8 does not have a cut-out portion provided at a radially outer region of the disk clamping element 840. Embodiments of the present application may or may not have a cut-out portion provided on a radially outer region thereof.

Figure 9:
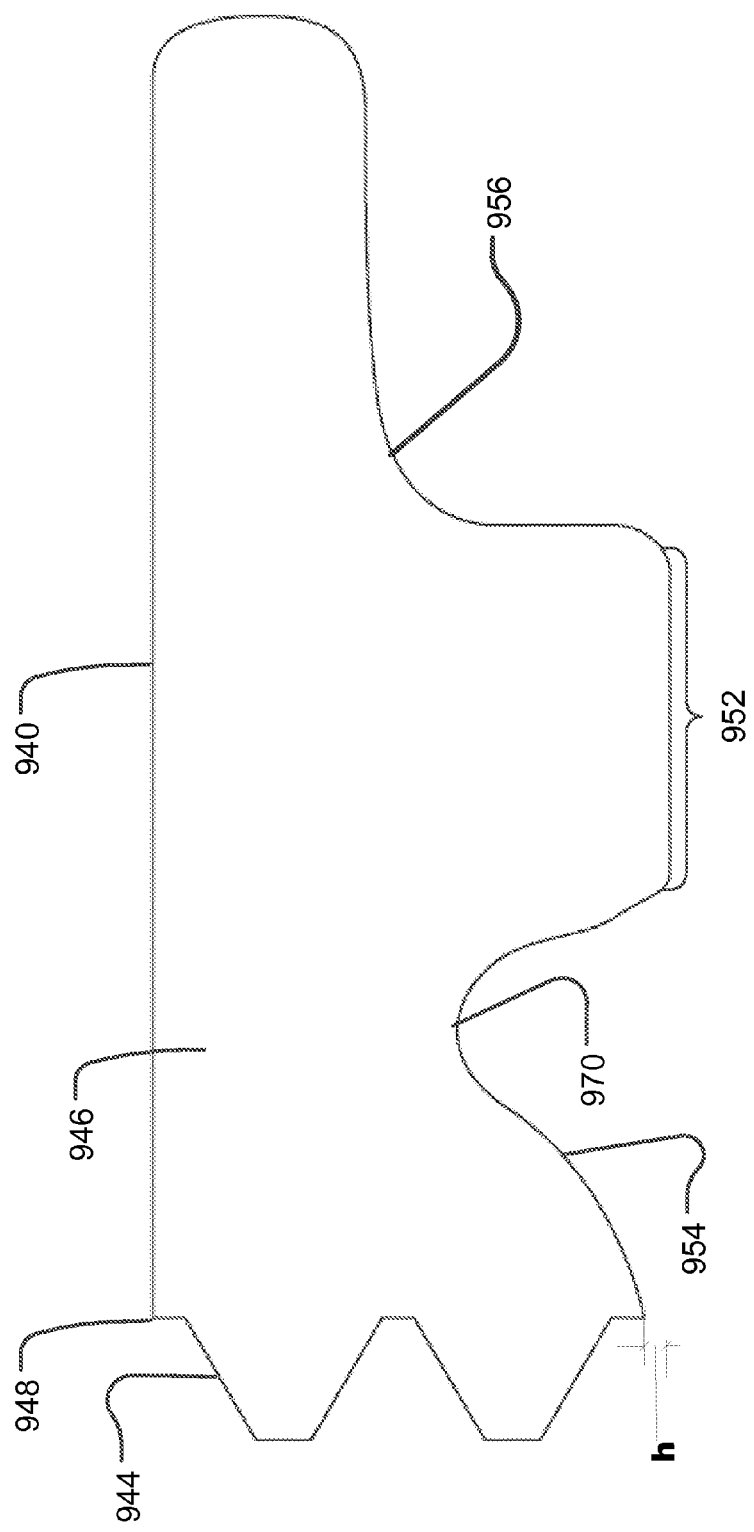
FIG. 9 is an enlarged sectional view of a third example embodiment of the disk clamp.

FIG. 9 is an enlarged sectional view of a third example embodiment of the disk clamping element 940. This third example embodiment of the disk assembly has some features similar to the first and second example embodiments such that redundant description may be omitted.

As with the first embodiment of the disk clamping element 940 discussed above, the disk clamping element 940 includes a substantially cylindrical body portion 946 having a hollow radially inner region forming an annular shape. Further, the radially inner vertical wall 948 of the annular shape of the body portion 946 may be configured to form a threaded portion 944. Additionally, the clamping element 940 of the present embodiment also includes an undercut portion 954 formed at a radially inner region of the bottom surface of the clamping element 940. By providing the undercut portion 954 at the radially inner region of the bottom surface of the clamping element 940, the disk media contacting surface 952 is moved radially outward. As discussed above, by moving the disk media contacting surface 952 radially outwards, conning and deflection of the disk media under the clamping force of the clamping element may be reduced.

The undercut portion 954 has a height h. In some embodiments, the height h of the undercut portion 954 may be 5 μm or more. In other embodiments, the height h of the undercut portion 954 may be directly proportional to the deflection of the radially inner most portion of the disk clamping element 940 in a z-direction when the drive is assembled.

However, in the embodiments shown in FIGS. 5 and 8, the under-cut portions 154 and 854 are formed to have a substantially constant height h. Conversely in the embodiment shown in FIG. 9, the under-cut portion increases in height along the radius of the clamping element 940, reaches a local maximum 970, and then decreases in height to form the disk contacting surface 952. By adjusting the height and location of the local maximum 970, the rigidity and clamping force of the clamping element 940 may be tuned.

Additionally, in the embodiment shown in FIG. 9, a cut-out portion 956 may be provided at the radially outer region of the disk clamping element 940. In some embodiments, the cut-out portion 956 may provide clearance for the head 106 to access an inner diameter of disk media 104. However, embodiments of the present application are not limited to this configuration and need not have a cut-out portion on a radially outer region of the disk clamp.

Figure 10:
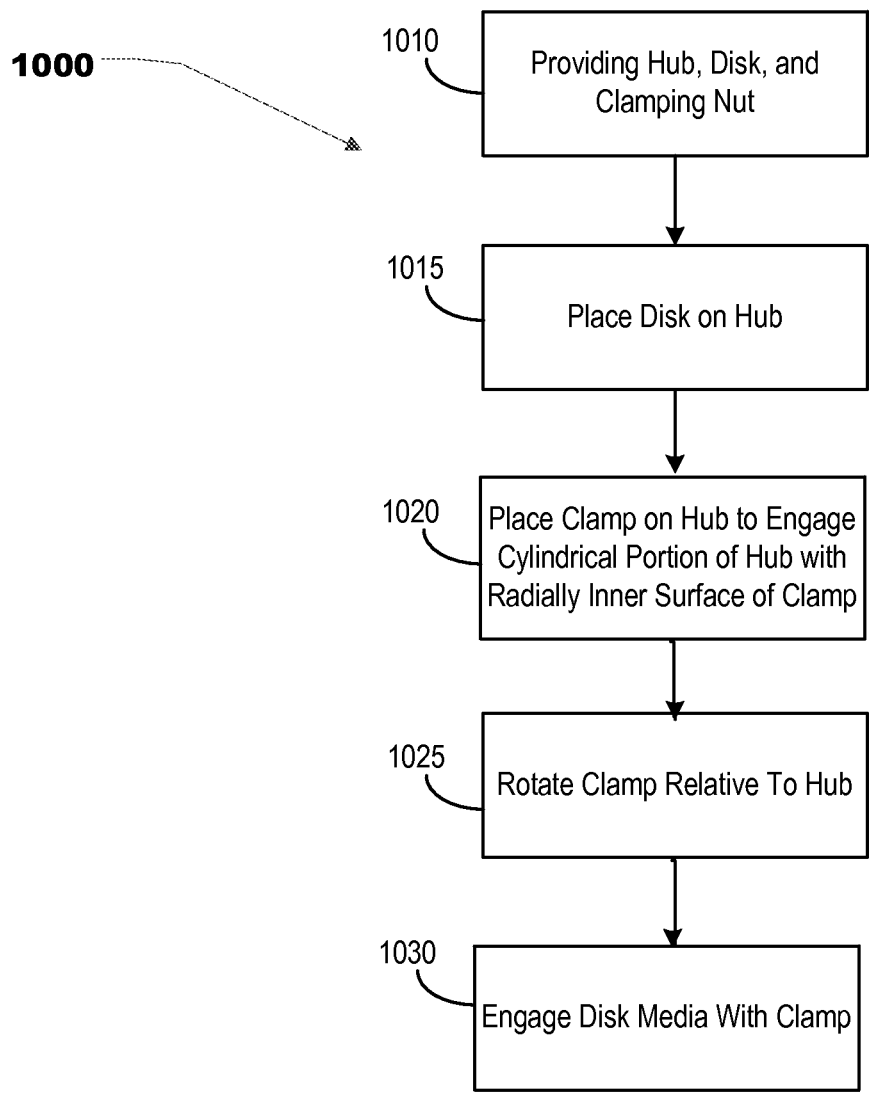
FIG. 10 illustrates a flowchart for a method of manufacturing a disk drive, according to one or more example embodiments.

FIG. 10 illustrates a flow chart for a method 1000 of manufacturing a disk drive, according to an illustrated example embodiment. This method 1000 will be discussed in the context of the hub 102, disk 104 and the disk clamping element 140 of FIGS. 1, 2, 3, 5, and 7-9. However, the acts disclosed herein may be executed using a variety of different disk hubs and disk clamps, in accordance with the described method.

As described herein, in some example embodiments, at least some of the acts included in the method 1000 may be orchestrated by a processor according to an automatic disk drive manufacturing algorithm, based at least in part on computer-readable instructions stored in computer-readable memory and executable by the processor. A manual implementation of one or more acts of the method 1000 may also be employed, in other example embodiments.

At act 1010, a disk hub 102, a disk 104 and clamping element 140 (840 in FIG. 8 and 940 in FIG. 9). The hub 102 may define a mounting surface and a cylindrical portion 108 having a vertical sidewall.

The disk clamping element 140 (840 in FIG. 8 and 940 in FIG. 9) includes a substantially cylindrical body portion 146 (846 in FIG. 8 and 946 in FIG. 9) having a hollow radially inner region forming an annular shape with a through-hole formed there through. Further, the radially inner vertical wall 148 (848 in FIG. 8 and 948 in FIG. 9) of the annular shape of the body portion 146 (846 in FIG. 8 and 946 in FIG. 9) may be configured to form a threaded portion 144 (844 in FIG. 8 and 944 in FIG. 9). Additionally, the clamping element 140 (840 in FIG. 8 and 940 in FIG. 9) of the present embodiment also includes an undercut portion 154 (854 in FIG. 8 and 954 in FIG. 9) formed at a radially inner region of the bottom surface of the clamping element 140 (840 in FIG. 8 and 940 in FIG. 9). By providing the undercut portion 154 (854 in FIG. 8 and 954 in FIG. 9) at the radially inner region of the bottom surface of the clamping element 140 (840 in FIG. 8 and 940 in FIG. 9), the disk media contacting surface 152 (852 in FIG. 8 and 952 in FIG. 9) is moved radially outward.

The disk 104 may define an opening there through having an inner diameter. The disk 104 may be formed in a variety of ways. In one example embodiment, the media of the disk 104 may be formed, and then the first disk 104 may be stamped, cast, machined or otherwise formed to define the first opening.

The hub 102 may also be formed in a variety of ways. In one example embodiment, the hub 102 may be machined to form the mounting surface, the cylindrical portion 108 and the vertical sidewall. In other example embodiments, the hub 102 may be cast, molded or machined to form the mounting surface and the vertical sidewall. In still other example embodiments, other manufacturing techniques may be employed.

Similarly, the manufacturing method of the disk clamping element 140 (840 in FIG. 8 and 940 in FIG. 9) is not particularly limited and may include machining, casting, molding, or any other methods as would be apparent to a person of ordinary skill in the art.

At act 1015, the disk 104 is positioned against the mounting surface of the hub 102. The cylindrical portion 108 of the hub 102 may be inserted through the opening formed in the disk 104 and the disk 104 may be positioned in physical contact with the mounting surface. In some example embodiments, a machine vision system may help align the disk 104 and the mounting surface of the hub 102.

In some embodiments, act 1015 may be repeated such that 2 or more disks 104 are placed on the hub 102, with a spacer 142 being placed between adjacent disks 104. However, in some embodiments act, 1015 may be performed only once such that only one disk 104 is placed on the hub 102, as would be apparent to a person of ordinary skill in the art.

At act 1020, the cylindrical portion 108 of the hub 102 may be inserted through the opening formed through the annularly shaped clamping element 140 (840 in FIG. 8 and 940 in FIG.

9). In some example embodiments, a machine vision system may help align the disk 104 and the mounting surface of the hub 102.

Additionally, the vertical wall 148 (848 in FIG. 8 and 948 in FIG. 9) of the clamping element 140 (840 in FIG. 8 and 940 in FIG. 9) is positioned to engage and contact the vertical sidewall of the hub 102. In some example embodiments, the vertical side wall of the hub 102 may have a threaded portion. In example embodiments with a threaded portion formed on the vertical side wall of the hub 102, the clamping element 140 (840 in FIG. 8 and 940 in FIG. 9) may be rotated with respect to the hub 102 so that the threaded portion 144 (844 in FIG. 8 and 944 in FIG. 9) of the clamping element 140 (840 in FIG. 8 and 940 in FIG. 9) screwingly engages the threaded portion of the hub 102 in act 1025.

After the clamping element 140 (840 in FIG. 8 and 940 in FIG. 9) is rotated with respect to the hub 102 in act 1025, the disk contacting surface 152 (852 in FIG. 8 and 952 in FIG. 9) of clamping element 140 (840 in FIG. 8 and 940 in FIG. 9) engages an upper surface of the disk 104 in act 1030 to secure the clamp in place.

The foregoing detailed description has set forth various example embodiments of the devices and/or processes via the use of block diagrams, schematics, and examples. Insofar as such block diagrams, schematics, and examples contain one or more functions and/or operations, each function and/or operation within such block diagrams, flowcharts, or examples can be implemented, individually and/or collectively, by a wide range of hardware, software, firmware, or virtually any combination thereof.

While certain embodiments have been described, these embodiments have been presented by way of example only, and are not intended to limit the scope of the protection. Indeed, the novel methods and apparatuses described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection.

What is claimed is:

1. A disk drive assembly comprising:
    a disk hub comprising a substantially cylindrical portion having a side wall, and
        a threaded portion on a radially outer surface of the side wall of the cylindrical portion;
    a disk clamping element comprising:
        a body portion having an inner wall configured to engage the side wall of the disk hub,
        a threaded portion on the inner wall of the body portion, and
        an undercut portion extending radially outward from a radially inner diameter of the body portion for a portion of a radius of the disk clamping element to form a step; and
    a disk media disposed between the disk hub and the disk clamping element,
    wherein the disk clamping element is oriented such that the undercut portion is positioned proximate to the disk media, and
    wherein the threaded portion of the disk clamping element threadingly engages the threaded portion of the disk hub.

2. The disk drive assembly according to claim 1, wherein the disk clamping element further comprises a cut-out formed in a lower, radially outer portion of the disk clamping element, the cut-out configured to provide access to a radially inner portion of the disk media.

3. The disk drive assembly according to claim 1, wherein a height of the undercut portion increases in a radially outward direction.

4. The disk drive assembly according to claim 3, wherein the height of the undercut portion increases to a local maximum, and then decreases, in a radially outward direction.

5. The disk drive assembly according to claim 1, wherein the undercut portion has a height of at least about 5 µm.

6. The disk drive assembly according to claim 1, wherein the undercut portion has a minimum height, $H_{min}$, defined by the equation:

$$H_{min} = |\delta_{ID}|,$$

wherein $\delta_{ID}$=Z-deflection of a radially inner most portion of the disk clamping element.

7. The disk drive assembly according to claim 1, wherein the disk clamping element further comprises at least one notch formed in a radially outer portion of the disk clamping element.

8. A disk clamping element configured to apply a clamping force to a disk media, the disk clamping element comprising:
    a body portion having an inner wall configured to engage a sidewall of a disk hub,
    a threaded portion on the inner wall of the body portion, and
    an undercut portion extending radially outward from a radially inner diameter of the body portion for a portion of a radius of the disk clamping element to form a step,
    wherein the threaded portion of the disk clamping element is configured to threadingly engage a threaded portion of the disk hub.

9. The disk clamping element according to claim 8, wherein the disk clamping element further comprises a cut-out formed in a lower, radially outer portion of the disk clamping element, the cut-out configured to provide access to a radially inner portion of a disk medium disposed between the disk clamping element and the disk hub.

10. The disk clamping element according to claim 8, wherein a height of the undercut portion increases in a radially outward direction.

11. The disk clamping element according to claim 10, wherein the height of the undercut portion increases to a local maximum, and then decreases in a radially outward direction.

12. The disk clamping element according to claim 8, wherein the undercut portion has a height of at least about 5 µm.

13. The disk clamping element according to claim 8, wherein the undercut portion has a minimum height, $H_{min}$, defined by the equation:

$$H_{min} = |\delta_{ID}|,$$

wherein $\delta_{ID}$=Z-deflection of a radially inner most portion of the disk clamping element.

14. The disk clamping element according to claim 8, wherein the disk clamping element further comprises at least one notch formed in a radially outer portion of the disk clamping element.

15. A method of assembling a disk drive comprising:
    providing a disk hub having a substantially cylindrical portion and a threaded portion on a radially outer surface of the substantially cylindrical portion, a disk clamping element having an undercut portion formed at a radially inner diameter of the disk clamping element and a threaded portion on a radially inner surface of the disk clamping element, and a disk media;

positioning the disk media proximal to the disk hub such that the substantially cylindrical portion of the disk hub is inserted into a first hole formed through the disk media; and positioning the disk clamping element proximate to the disk hub such that:

(1) the substantially cylindrical portion of the disk hub is inserted into a second hole formed through the disk clamping element, and (2) a radially inner region of the disk clamping element engages the substantially cylindrical portion, wherein a lower surface of the disk clamping element that is radially outward of the undercut portion contacts an upper surface of the disk media, wherein the positioning the disk clamping element proximate to the disk hub comprises positioning the threaded portion of the disk clamping element to threadingly engage the threaded portion of the disk hub and rotating the disk clamping element until the lower surface of the disk clamping element that is radially outward of the undercut portion contacts the upper surface of the disk media and a radially outer region of the disk clamping element deflects away from the disk media.

* * * * *